INVENTORS
EARL E. JOHNSON
WALTER L. McCANN
by: Wolfe, Hubbard, Voit & Osann
ATTYS.

Fig. 3

| FEED NO. | ACTUAL FEED I.P.M. | FEED I.P.R. | THEORETICAL CHANGE PER STEP | FEED TRANSMISSION STAGE RATIO | | | SOLENOID VALVE ON(+) OR OFF(-) | | | | | | | | | | |
|---|---|---|---|---|---|---|---|---|---|---|---|---|---|---|---|---|---|
| | | | | I | II | III | SV 15 | SV 16 | SV 17 | SV 18 | SV 19 | SV 20 | SV 21 | SV 22 | SV 23 | SV 24 26 | SV 25 |
| 1 | 140. | .125 | | 24/5 | 17/72×6/1 | −24/66 | + | − | − | + | − | + | − | + | − | + | + | − |
| 2 | 116.7 | .104 | 18.9 | 4/1 | 17/72×6/1 | −24/66 | + | − | − | + | − | + | − | + | + | − | + | − |
| 3 | 98.9 | .088 | 18.9 | 24/5 | 1/6×6/1 | −24/66 | + | − | − | + | − | + | + | − | − | + | + | − |
| 4 | 82.35 | .0737 | 18.9 | 4/1 | 1/6×6/1 | −24/66 | + | − | − | + | − | + | + | − | + | − | + | − |
| 5 | 70. | .0625 | 18.9 | 24/5 | 17/72×3/1 | −24/66 | + | − | − | + | + | − | − | + | − | + | + | − |
| 6 | 58.3 | .0521 | 18.9 | 4/1 | 17/72×3/1 | −24/66 | + | − | − | + | + | − | − | + | + | − | + | − |
| 7 | 49.4 | .0441 | 18.9 | 24/5 | 1/6×3/1 | −24/66 | + | − | − | + | + | − | + | − | − | + | + | − |
| 8 | 41.17 | .0368 | 18.9 | 4/1 | 1/6×3/1 | −24/66 | + | − | − | + | + | − | + | − | + | − | + | − |
| 9 | 34. | .03125 | 18.9 | 24/5 | 17/72×6/1 | −1/11 | − | + | ±R | ±R | − | + | − | + | − | + | + | − |
| 10 | 29.17 | .026 | 18.9 | 4/1 | 17/72×6/1 | −1/11 | − | + | ±R | ±R | − | + | − | + | + | − | + | − |
| 11 | 24.7 | .0220 | 18.9 | 24/5 | 1/6×6/1 | −1/11 | − | + | ±R | ±R | − | + | + | − | − | + | + | − |
| 12 | 20.6 | .0183 | 18.9 | 4/1 | 1/6×6/1 | −1/11 | − | + | ±R | ±R | − | + | + | − | + | − | + | − |
| 13 | 17.5 | .015625 | 18.9 | 24/5 | 17/72×3/1 | −1/11 | − | + | ±R | ±R | + | − | − | + | − | + | + | − |
| 14 | 14.53 | .0130 | 18.9 | 4/1 | 17/72×3/1 | −1/11 | − | + | ±R | ±R | + | − | − | + | + | − | + | − |
| 15 | 12.35 | .0110 | 18.9 | 24/5 | 1/6×3/1 | −1/11 | − | + | ±R | ±R | + | − | + | − | − | + | + | − |
| 16 | 10.29 | .0092 | 18.9 | 4/1 | 1/6×3/1 | −1/11 | − | + | ±R | ±R | + | − | + | − | + | − | + | − |
| 17 | 8.72 | .0078 | 18.9 | 24/5 | 17/72×6/1 | −1/44 | + | − | + | − | − | + | − | + | − | + | + | − |
| 18 | 7.3 | .0065 | 18.9 | 4/1 | 17/72×6/1 | −1/44 | + | − | + | − | − | + | − | + | + | − | + | − |
| 19 | 6.16 | .0055 | 18.9 | 24/5 | 1/6×6/1 | −1/44 | + | − | + | − | − | + | + | − | − | + | + | − |
| 20 | 5.15 | .0046 | 18.9 | 4/1 | 1/6×6/1 | −1/44 | + | − | + | − | − | + | + | − | + | − | + | − |
| 21 | 4.38 | .0039 | 18.9 | 24/5 | 17/72×3/1 | −1/44 | + | − | + | − | + | − | − | + | − | + | + | − |
| 22 | 3.65 | .0032 | 18.9 | 4/1 | 17/72×3/1 | −1/44 | + | − | + | − | + | − | − | + | + | − | + | − |
| 23 | 3.08 | .0028 | 18.9 | 24/5 | 1/6×3/1 | −1/44 | + | − | + | − | + | − | + | − | − | + | + | − |
| 24 | 2.58 | .0023 | 18.9 | 4/1 | 1/6×3/1 | −1/44 | + | − | + | − | + | − | + | − | + | − | + | − |
| 25 | 1.82 | .0016 | 41.4 | 1/16 | 17/72×6/1 | −24/66 | + | − | − | + | − | + | − | + | ±R | ±R | − | + |
| 26 | 1.285 | .0011 | 41.4 | 1/16 | 1/6×6/1 | −24/66 | + | − | − | + | − | + | + | − | ±R | ±R | − | + |
| 27 | .912 | .0008 | 41.4 | 1/16 | 17/72×3/1 | −24/66 | + | − | − | + | + | − | − | + | ±R | ±R | − | + |
| 28 | .643 | .0006 | 41.4 | 1/16 | 1/6×3/1 | −24/66 | + | − | − | + | + | − | + | − | ±R | ±R | − | + |
| 29 | .456 | .0004 | 41.4 | 1/16 | 17/72×6/1 | −1/11 | − | + | ±R | ±R | − | + | − | + | ±R | ±R | − | + |
| 30 | .323 | .0003 | 41.4 | 1/16 | 1/6×6/1 | −1/11 | − | + | ±R | ±R | − | + | + | − | ±R | ±R | − | + |
| 31 | .228 | .0002 | 41.4 | 1/16 | 17/72×3/1 | −1/11 | − | + | ±R | ±R | + | − | − | + | ±R | ±R | − | + |
| 32 | .16 | .00014 | 41.4 | 1/16 | 1/6×3/1 | −1/11 | − | + | ±R | ±R | + | − | + | − | ±R | ±R | − | + |
| 33 | .1138 | .0001 | 41.4 | 1/16 | 17/72×6/1 | −1/44 | + | − | + | − | − | + | − | + | ±R | ±R | − | + |
| 34 | .0805 | .00007 | 41.4 | 1/16 | 1/6×6/1 | −1/44 | + | − | + | − | − | + | + | − | ±R | ±R | − | + |
| 35 | .0565 | .00005 | 41.4 | 1/16 | 17/72×3/1 | −1/44 | + | − | + | − | + | − | − | + | ±R | ±R | − | + |
| 36 | .0402 | .00003 | 41.4 | 1/16 | 1/6×3/1 | −1/44 | + | − | + | − | + | − | + | − | ±R | ±R | − | + |

INVENTORS
EARL E. JOHNSON
WALTER L. McCANN by: *Wolfe, Hubbard, Voit & Osann*
ATTYS.

United States Patent Office 3,417,639
Patented Dec. 24, 1968

3,417,639
PLANETARY SPEED CHANGE TRANSMISSION
FOR MACHINE TOOL FEED DRIVES
Earl E. Johnson and Walter L. McCann, Fond du Lac,
Wis., assignors to Giddings & Lewis Inc., a corporation
of Wisconsin
Filed Apr. 6, 1966, Ser. No. 540,541
3 Claims. (Cl. 74—758)

ABSTRACT OF THE DISCLOSURE

A machine tool feed drive transmission is described in which three modular planetary transmission units are stacked in series to effect a large number of closely spaced output speed steps in an upper range, and a plurality of more widely spaced steps in a lower range, and in which a differential planetary gear set is employed to achieve both updrive and downdrive output speed ratios in the first transmission unit.

---

The present invention relates in general to planetary transmissions for machine tools and, more specifically, to a feed drive transmission for one or more of the major component elements of a machine tool.

The invention represents an improvement over the multistage planetary transmission disclosed in Walter L. McCann et al. U.S. Patent No. 3,290,962, issued Dec. 13, 1966. It finds particular, but by no means exclusive, utility as a feed drive transmission for the spindle, table, saddle, or end support of a horizontal boring, drilling and milling machine of the type disclosed in Edgar L. McFerren et al. U.S. Patent No. 3,188,891 issued June 15, 1965.

One object of the invention is to provide a multistage planetary transmission comprising a plurality of individual transmission units combined in such a manner as to produce speed selection characteristics particularly well suited for machine tool feed drives.

Another object of the invention is to provide a multistage planetary transmission feed drive of the character set forth and having a relatively large number of closely spaced speed selection steps situated in the upper portion of the overall speed range.

A further object of the invention is to provide a planetary speed change transmission for a feed drive of the character set forth and which will be of relatively simple, compact and economical construction but sufficiently rugged to withstand hard day to day usage under numerical control.

Other objects and advantages will become apparent as the following description proceeds, taken together with the accompanying drawings, wherein.

Figure 1:
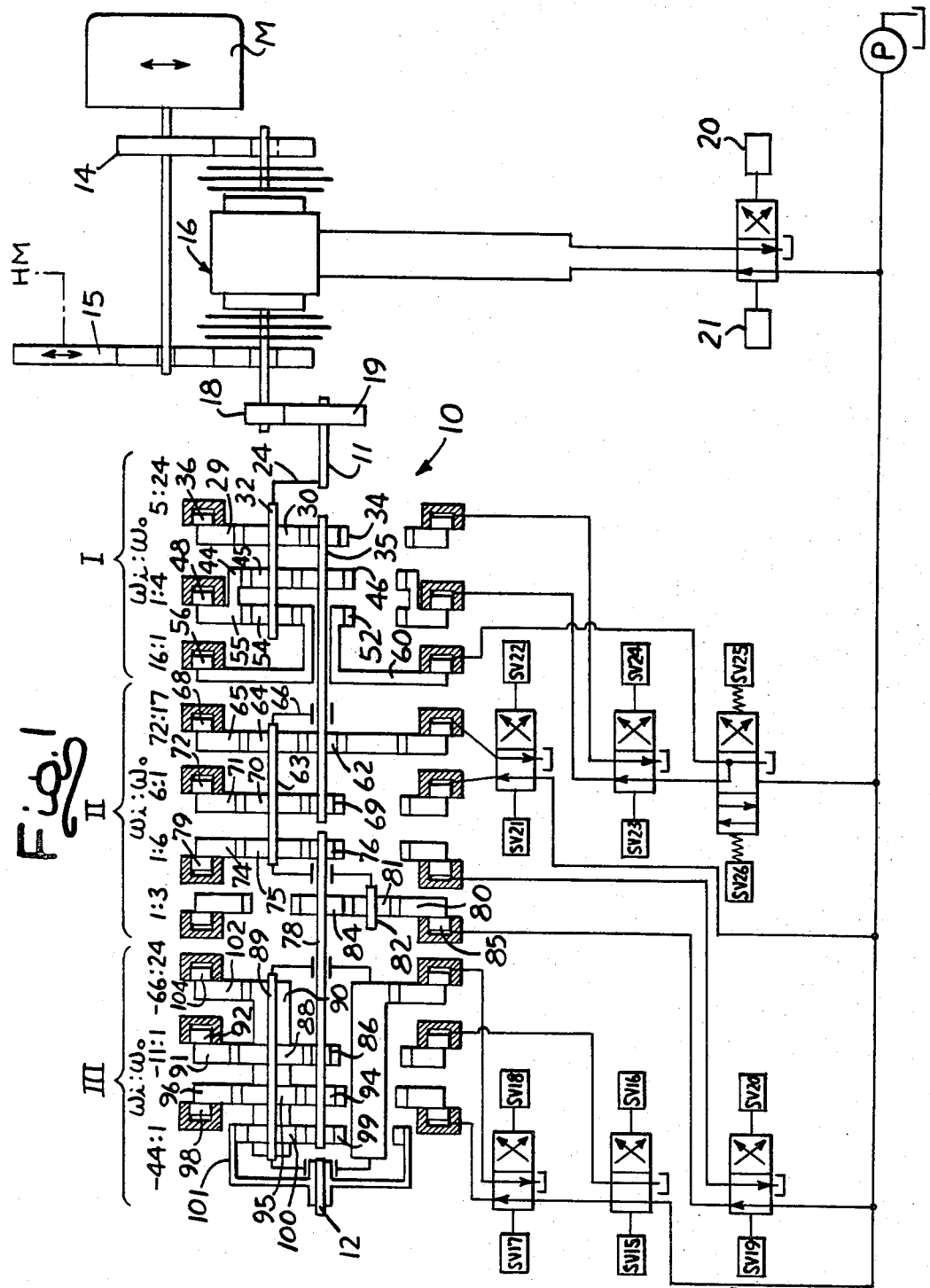
FIGURE 1 is a diagrammatic view taken axially through a multistage planetary transmission which illustratively embodies the present invention.
Figure 2:
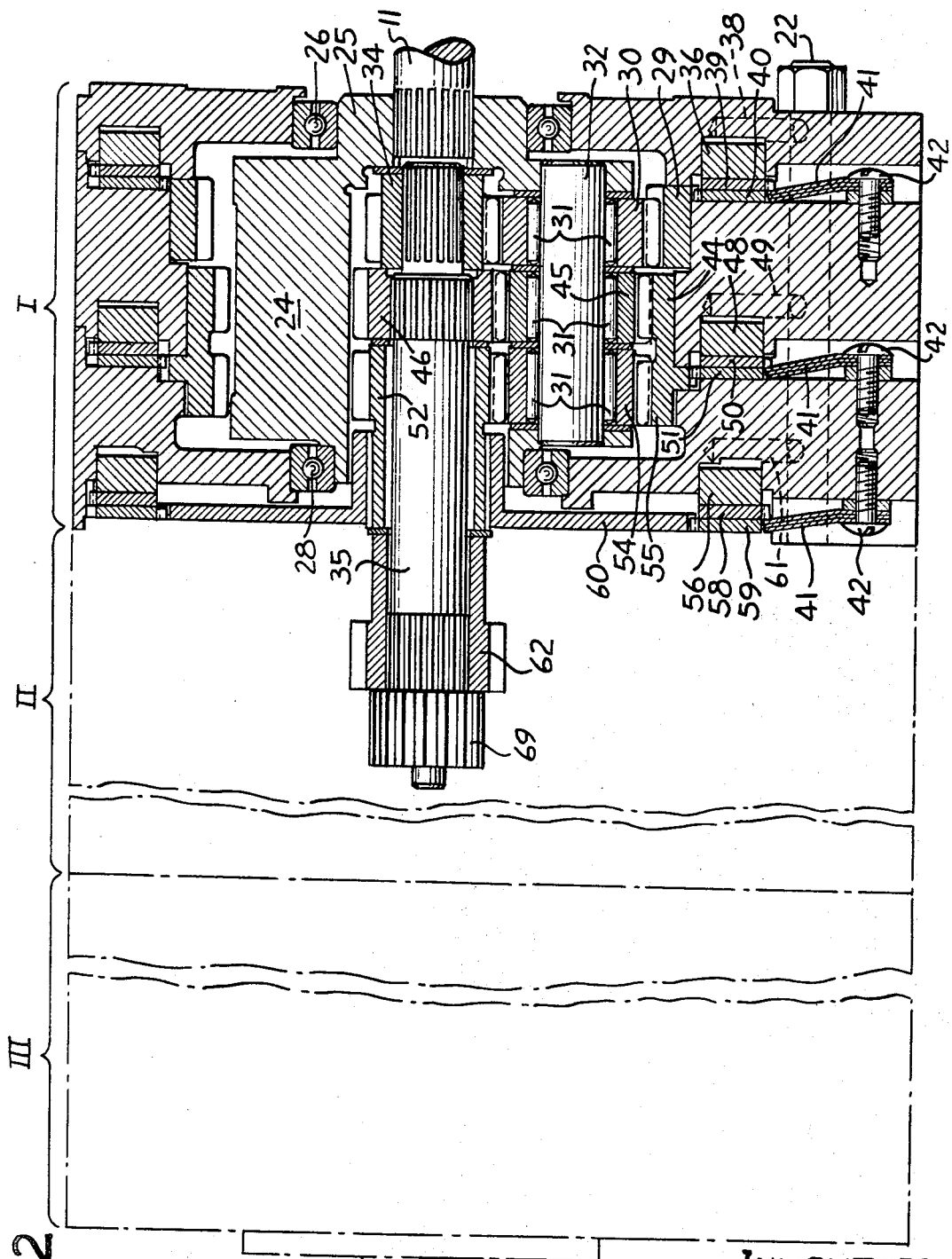
FIG. 2 is an enlarged longitudinal sectional view taken through the first stage unit of the illustrative transmission constructed in accordance with FIG. 1.

FIG. 3 presents a tabulation of the feed rates available with the illustrative transmission shown in FIGS. 1 and 2.

While the invention is susceptible of various modifications and alternative constructions, a certain illustrative embodiment has been shown in the drawings and will be described below in considerable detail. It should be understood, however, that there is no intention to limit the invention to the specific form disclosed, but, on the contrary, the intention is to cover all modifications, alternative constructions and equivalents falling within the spirit and scope of the invention as expressed in the appended claims.

Referring more specifically to FIG. 1, the invention is there exemplified in a multistage planetary transmission 10 having an input shaft 11 at its right-hand end and an output shaft 12 at its left-hand end (as viewed in FIG. 1). The transmission 10 may, for example, be incorporated in a horizontal boring, drilling and milling machine to control the feed of the cutting tool relative to the workpiece.

The input shaft 11 may be driven selectively by a reversible feed drive motor M and its drive pinion 14, or by a reversible headstock spindle drive motor HM (not shown) via an appropriate power train terminating in a drive pinion 15. In either case, the drive includes a drive transfer unit 16 and gears 18, 19. The transfer unit 16 may be in the form of a pair of hydraulically actuated disk clutches adapted to couple the input shaft 11 selectively with the drive motor M and its pinion 14 or with the drive pinion 15 from the power train associated with the headstock motor. The transfer unit 16 is actuated by solenoid valves 20 and 21. When the transmission 10 is coupled to the motor M, the feed rates are in inches per minute, and when the transmission is coupled to the headstock motor the feed rates are in inches per revolution of the tool spindle.

The output shaft 12 of the transmission 10 may be selectively connected by appropriate power trains (not shown) with the headstock lead screw, the saddle lead screw, the table lead screw, or the end support lead screw of the associated horizontal boring, drilling and milling machine.

The transmission 10 in this case comprises three stages defined, respectively, by modular planetary units I, II and III of the general type disclosed in McCann et al. Patent No. 3,290,962 referred to earlier herein. The units I, II and III are stacked along a common axis in torque transmitting relation with each other and are secured together as by means of a plurality of through bolts 22 (FIG. 2) which extend through registered openings in the housings of the various units. Each unit includes a plurality of planetary gear trains having a corresponding plurality of selectively actuable brakes associated therewith. The brakes are adapted to stop selectively a sun gear, ring gear or planet carrier, causing them to serve as reaction members and thus effecting drives at selected speed ratios through the various planetary trains.

Turning to unit I in greater detail, it will be noted that the same comprises a planetary carrier 24 having a hub 25 which drivingly receives input shaft 11 with a splined connection (FIG. 2). The carrier 24 is journaled in the housing of unit I by means of axially spaced antifriction bearings 26, 28. Operatively associated with the carrier 24 is a first planetary gear set comprising a ring gear 29 journaled in the unit housing, a meshing planetary gear 30 journaled as by means of needle bearings 31 on a shaft 32 fixed to the carrier, and a meshing sun gear 34. The latter is drivingly fixed to a unit output shaft 35 by means of an appropriate splined connection.

In order to effect a drive between the input shaft 11 and the unit output shaft 35 via the first planetary gear set 29, 30, 34, the unit includes an annular brake member 36 selectively actuable by applying pressure fluid to its rear face via a passage 38. Control of the pressure fluid in this instance is effected by means of a pair of solenoid valves. Operatively associated with the brake element 36 are a pair of pressure disks 39, 40, the former being secured against rotation by means of teeth on its outer periphery which engage corresponding teeth in the housing, and the latter being drivingly coupled to the ring gear 29 by teeth on its inner periphery which engage corresponding teeth on the ring gear. A plurality of laminated leaf springs 41, secured to the housing as by means of screws 42, engage the outer peripheral portion of the ring 39 at circumferentially spaced points and tend to bias the latter and the annular brake element 36 to the right as viewed in FIG. 2 upon release of fluid pressure. The first planetary gear set 29, 30, 34 has appropriate pitch diameters and numbers of teeth to effect an updrive ratio of 5:24 between the input shaft 11 and the output shaft 35.

The unit I includes a second planetary gear set comprising a ring gear 44, a meshing planet gear 45 journaled as by needle bearings 31 on carrier shaft 32, and a meshing sun gear 46. The latter is drivingly fixed to the unit output shaft 35 by an appropriate splined connection. The second planetary gear set may be selectively rendered effective to transmit power between the input shaft 11 and the unit output shaft 35.

Power transmission through the second planetary gear set is accomplished by the use of a brake member 48, similar to the member 36, and selectively actuated by pressure fluid through passage 49 under control of solenoid valves. Pressure disks 50, 51 are interposed between the brake member 48 and the ring gear 44, the disk 50 being connected to the housing by teeth on its outer periphery and the disk 51 being connected to the ring gear 44 by teeth on its inner periphery. A plurality of leaf springs 41 fixed to the housing as by screws 42 bias the ring 50 and brake element 48 toward the right as viewed in FIG. 2 upon release of the pressure fluid. The second planetary gear set 44, 45, 46 has suitable pitch diameters and numbers of teeth to effect an updrive ratio of 1:4 between the input shaft 11 and the unit output shaft 35.

The unit I further includes a differential planetary gear set including sun gear 52, meshing planet gear 54 journaled on the carrier shaft 32, and meshing ring gear 55. Also included in the differential planetary set are the gears of the second planetary set, namely, ring gear 44, integral with the ring gear 55 but having a different number of teeth, planet gear 45, and sun pinion 46 which constitutes the output member of the differential.

Selective actuation of the differential planetary gear set to transmit power between the input shaft 11 and the unit output shaft 35 may be accomplished through the use of brake member 56 which is similar to the brake members 36 and 48. The brake member 56 has a pair of pressure disks 58, 59 associated therewith. The disk 58 is held against rotation by teeth on its outer periphery which engage the housing. It is also engaged by leaf springs 41 which urge it and brake member 56 to the right. The disk 59 has teeth on its inner periphery which engage a flange member 60. The latter has a splined central opening which drivingly receives an externally splined sleeve integral with the sun gear 52. Upon application of pressure fluid to the brake member 56 via passage 61 under control of suitable solenoid valves, the flange member 60 and sun gear 52 are held against rotation. This effects a drive from input shaft 11 via carrier 24, planet pinion 54, ring gears 55, 44, planet pinion 45, and sun pinion 46 which is splined on unit output shaft 35. The actual gear reduction through the differential planetary set is 16:1.

Referring next to unit II (FIG. 1), this unit comprises four straight planetary gear sets which may be selectively operated in pairs to provide four different speed changes. The first planetary gear set comprises sun gear 62, planet gear 64 and ring gear 65. The input member of this set is sun gear 62 which is drivingly splined to the output shaft 35 of unit I. The planet gear 64, which drivingly meshes with sun gear 62, is journaled on pinion shaft 63 fixed to a carrier 66, the latter being journaled on suitable bearings within the housing of unit II. The ring gear 65 drivingly meshes with the planet gear 64 and may be selectively held against rotation as by means of a fluid actuated brake member 68 similar to those described in connection with unit I.

The second planetary gear set of unit II comprises a sun gear 69 fixed to the output shaft 35 of unit I, a meshing planet gear 70 journaled on shaft 63 of the carrier 66, and a meshing ring gear 71. The latter is operatively associated with a fluid actuated brake member 72 which is adapted selectively to hold the ring gear 71 against rotation.

The third planetary gear set of unit II comprises a ring gear 74, a meshing planet gear 75 journaled on the shaft 63 of the carrier 66, and a meshing sun gear 76 drivingly secured to unit output shaft 78. The sun gear 76 thus serves as the output member of the third planetary gear set. The latter may be selectively operated to transmit power, such being accomplished through the use of fluid actuated brake member 79 adapted when energized to hold the ring gear 74 against rotation.

The fourth planetary gear set of the unit II comprises a ring gear 80, a meshing planet gear 81 journaled on a separate pinion shaft 82 fixed to the carrier 66, and a meshing sun gear 84 drivingly secured to unit output shaft 78. The member 84 thus constitutes the output element of this fourth planetary gear set. The latter may be selectively operated to transmit power through the use of fluid actuated brake member 85 adapted, when energized, to hold the ring gear 80 against rotation.

Unit II may be operated by utilizing various ones of the planetary gear sets in appropriate pairs of input and output members. For example, nominal direct drive through the unit II may be effected by energizing the brakes 68 and 79 controlling the first and third planetary sets of the unit. In that event, the input member is the sun gear 62 and the output member is the sun gear 76. Operation of the brakes 72 and 79 will activate the second and third planetary gear sets and will produce a ratio of 1:1.4167 through the unit II. In that case, the input member is the sun gear 69 and the output member is the sun gear 76. Operation of the brakes 68 and 85 results in actuation of the first and fourth sets and produces a ratio of 1:2 through the unit. In that event, the input member is the sun gear 62 and the output member is the sun gear 84.

Turning now to unit III, it will be noted that this unit comprises two differential planetary gear sets and one straight planetary gear set which serves as the output of the differential sets. The first differential planetary gear set comprises a sun gear 86, drivingly splined or otherwise fixed to the shaft 78, a meshing planet gear 88 journaled on shaft 89 of carrier 90, and a meshing ring gear 91 adapted to be selectively held against rotation by means of fluid actuated brake 92 similar to those described earlier herein. The carrier 90 is journaled on suitable bearings and is rotatable within the unit III.

The second differential planetary gear set of unit III comprises sun gear 94 drivingly fixed to shaft 78, meshing planet gear 95 journaled on shaft 89 of carrier 90 and meshing ring gear 96. The latter may be selectively held against rotation by means of fluid actuated brake member 98.

The straight planetary gear set of unit III comprises sun gear 99 drivingly fixed to the shaft 78, meshing planet gear 100 journaled on shaft 89 of carrier 90, and meshing output ring gear 101 having a flanged portion and hub drivingly splined or otherwise rigidly fixed to the transmission output shaft 12.

The carrier 90 is formed with a plurality of peripheral gear teeth at its right-hand end, as viewed in FIG. 1. These teeth on the carrier mesh with those of a surrounding ring gear 102 which may be selectively held against rotation by means of a fluid actuated brake 104 associated therewith.

Nominal direct drive through unit III may be effected by energizing the brake member 104. This holds the ring gear 102 and carrier 90 against rotation. Power is then transmitted from sun pinion 99 on shaft 78 via planet gear 100 and output ring gear 101 to the transmission output shaft 12.

Energizing the brake member 92 will result in holding the ring gear 91 against rotation and will provide a 1:4 reduction step through unit III. In such event, power is transmitted from sun gear 86 on shaft 78 to planet gear 88, causing carrier 90 to rotate, the ring gear 91 serving as the reaction member. As the carrier 90 rotates, the planet gear 100 is also rotated by the sun gear 99 which is fixed to the shaft 78. Planet gear 100 drives the output ring gear 101 which is fixed to output shaft 12, providing a differential output drive.

To provide a 1:16 reduction step through the unit III, the brake member 98 is energized. This holds the ring gear 96 against rotation and makes it a reaction member. Power is then transmitted from the sun gear 94 on shaft 78 to planet gear 95, causing the carrier 90 to rotate, with the ring gear 96 serving as the reaction member. Since the sun gear 99 is also fixed to the shaft 78, rotation of the carrier will result in rotation of the meshing planet gear 100 so as to provide a differential output drive through output ring gear 101 and shaft 12.

It will be appreciated from the foregoing that the transmission 10 affords a wide range of non-overlapping, precisely spaced speed changes, thirty-six in all. These are derived from combinations of the various drive ratios obtainable in individual units of the transmission. Unit I produces three drive ratios, unit II produces four, and unit III produces three. The fact that units I and III each produce three drive ratios, utilizing only three planetary gear sets each, substantially simplifies the construction of the transmission and enhances its compactness.

The thirty-six speed changes obtainable with the transmission 10, including the control set-up to effect each one, are illustrated in the tabulation presented in FIG. 3. It will be noted upon reference to FIG. 3 that the smallest speed changes are in substantially uniform increments of slightly less than 20 percent each, concentrated in the first two-thirds of the range where most needed. The remaining increments are also in substantially uniform steps but somewhat larger, being slightly over 40 percent each.

What is claimed is:

1. A multistage feed drive planetary transmission for controlling the feed of a cutting tool relatively to a workpiece machine tool comprising, in combination
   a first transmission unit having a plurality of first output speed ratios in geometrically even closely spaced incremental relationship and an additional output speed ratio lower than said first ratios by a geometrically larger incremental speed ratio differential;
   a second transmission unit serially connected to said first transmission unit and having a plurality of geometrically even spaced incremental output speed ratios; and
   a third transmission unit serially connected to said second transmission unit and having a plurality of geometrically even spaced incremental output speed ratios;
   The geometric increments of said second transmission unit being approximately twice the magnitude of the geometric increments of said first speed ratios of said first transmission unit; and
   said additional speed ratio of said first transmission unit being chosen such that the speed ratio product of the lowest of said first transmission unit first speed ratios and the lowest of each of said second and third transmission speed ratios is numerically greater than the product of said additional first transmission unit speed ratio and the highest of each of said second and third transmission speed ratios;
   whereby a plurality of resultant output speed ratios is obtained for said feed drive transmission which include a plurality of geometrically even closely spaced incremental speed ratios in high band, and a plurality of geometrically even closely spaced speed ratios of wider spacing in a low band.

2. Apparatus as defined in claim 1 in which said first transmission unit includes an input member in the form of a planet carrier, a first planetary gear set including a ring gear, a planet gear meshing therewith and journaled on said planet carrier, a sun gear meshing with said planet gear and fixed to a unit output shaft, a second planetary gear set including a second sun gear fixed to said unit output shaft, a second planet gear journaled on said carrier and meshing with said second sun gear, a second ring gear meshing with said second sun gear, a third planetary gear set including a third sun gear, a third planet gear journaled on said carrier and meshing with said third sun gear, a third ring gear fixed to said second ring gear and meshing with said third planet gear, and means for selectively braking said first and second ring gears and said third sun gear against rotation to serve as reaction members enabling their respective gear sets to transmit power at two geometrically closely spaced first output speed ratios and an additional output speed ratio lower than said first speed ratio by a geometrically larger incremental speed ratio differential.

3. In a multistage feed drive transmission for controlling the feed of a cutting tool relative to a workpiece in a machine tool, the combination comprising
   a first transmission unit having input and output elements and including a first planetary gear set, a second planetary gear set, and a differential planetary gear set, each set having sun, planet, and ring gears, said differential planetary gear set having a common planet gear carrier with said second planetary gear set, the ring gears of said first and second planetary gear sets each having power brake means for selectively effecting power transmission through said first transmission unit at two closely spaced updrive speed ratios, and the sun gear of said differential planetary gear set having power brake means for selectively effecting a third downdrive speed ratio lower than and widely spaced from said first two output speed ratios;
   a second transmission unit having input and output elements and including a plurality of planetary gear sets each having sun, planet and ring gears, and power brake means for selectively arresting each of the ring gears of said planetary gear sets in said second transmission unit for effecting a plurality of output speed ratios from said second transmission unit which are spaced in geometrically even speed increments; and
   a third transmission unit having input and output elements and including a plurality of planetary gear sets each having sun, planet and ring gears, and power brake means for selectively arresting each of the ring gears of said planetary gear sets in said third transmission unit for effecting a plurality of output speed ratios from said third transmission unit which are spaced in geometrically even speed increments; and
   said first, second and third transmission units being serially coupled in torque transmitting relationship.

(References on following page)

References Cited

UNITED STATES PATENTS

| | | | |
|---|---|---|---|
| 641,097 | 1/1900 | Gerard | 74—768 |
| 658,620 | 9/1900 | Clarke et al. | 74—764 |
| 1,383,988 | 7/1921 | DeNormanville | 74—759 |
| 1,404,675 | 1/1922 | Wilson | 74—761 |
| 1,814,096 | 7/1931 | Saki | 74—765 |
| 3,021,729 | 2/1962 | Chambers et al. | 74—768 |
| 3,137,182 | 6/1964 | Berchtold et al. | 74—769 X |
| 3,267,769 | 8/1966 | Tuck et al. | 74—759 |
| 3,290,962 | 12/1966 | McCann et al. | 74—760 |
| 3,298,252 | 1/1967 | Harris et al. | 74—761 |

FOREIGN PATENTS

| | | |
|---|---|---|
| 644,397 | 7/1962 | Canada. |
| 1,375,951 | 9/1964 | France. |
| 743,814 | 1/1956 | Great Britain. |

FRED C. MATTERN, JR., Primary Examiner.

THOMAS C. PERRY, Assistant Examiner.

U.S. Cl. X.R.

74—760, 764, 768